(12) United States Patent
Maeda et al.

(10) Patent No.: US 10,414,295 B2
(45) Date of Patent: Sep. 17, 2019

(54) RECLINING DEVICE AND METHOD OF MANUFACTURING RECLINING DEVICE

(71) Applicant: SHIROKI CORPORATION, Fujisawa-shi (JP)

(72) Inventors: Noriaki Maeda, Fujisawa (JP); Nobumasa Higashi, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/655,709

(22) Filed: Jul. 20, 2017

(65) Prior Publication Data

US 2018/0029506 A1 Feb. 1, 2018

(30) Foreign Application Priority Data

Jul. 28, 2016 (JP) ................................. 2016-148085

(51) Int. Cl.
*B60N 2/20* (2006.01)
*B60N 2/235* (2006.01)
*A47C 1/026* (2006.01)

(52) U.S. Cl.
CPC .............. *B60N 2/236* (2015.04); *B60N 2/20* (2013.01); *A47C 1/026* (2013.01); *B60N 2/235* (2013.01)

(58) Field of Classification Search
CPC .......... B60N 2/236; B60N 2/20; B60N 2/235; A47C 1/026
USPC .......................................... 297/367 R, 367 P
See application file for complete search history.

(56) References Cited

U.S. PATENT DOCUMENTS

| 5,154,476 | A | * | 10/1992 | Haider ................. | B60N 2/2352 297/367 R |
| 8,998,330 | B2 | | 4/2015 | Ito | |
| 2008/0122282 | A1 | * | 5/2008 | Matsumoto .......... | B60N 2/2362 297/367 R |
| 2009/0224583 | A1 | * | 9/2009 | Nagura .................. | B60N 2/236 297/302.6 |
| 2010/0127546 | A1 | * | 5/2010 | Dziedzic ................ | B60N 2/236 297/367 R |
| 2010/0231022 | A1 | * | 9/2010 | Kim ..................... | B60N 2/2356 297/367 R |
| 2011/0018325 | A1 | * | 1/2011 | Yamada ................. | B60N 2/236 297/367 R |

(Continued)

FOREIGN PATENT DOCUMENTS

JP 2012-200483 A 10/2012
WO WO 2012/132552 A1 10/2012

*Primary Examiner* — Syed A Islam
(74) *Attorney, Agent, or Firm* — McGinn i.P. Law Group, PLLC.

(57) ABSTRACT

A reclining device includes a first member having a closed-bottomed cylindrical shape and having internal teeth formed on an inner circumferential surface along a circumferential direction, a pawl having external teeth capable of meshing with the internal teeth, a second member provided on an opening side of the first member and having a pawl guide for guiding movement of the pawl between a lock position and an unlock position, and a cam provided between the first member and the second member turnably in relation to the first and second members and urging the pawl to a direction of engaging the external teeth with the internal teeth according to an angle of turn. The pawl has opposite surface-roughened side walls facing and guided by guide wall surfaces of the pawl guide.

4 Claims, 12 Drawing Sheets

(56) References Cited

U.S. PATENT DOCUMENTS

| | | | |
|---|---|---|---|
| 2012/0161488 A1* | 6/2012 | Ishihara | B60N 2/236 297/367 R |
| 2012/0217782 A1* | 8/2012 | Yamada | B60N 2/2356 297/367 R |
| 2014/0001808 A1 | 1/2014 | Ito | |
| 2014/0077563 A1* | 3/2014 | Higashi | A47C 1/024 297/367 R |
| 2015/0008715 A1* | 1/2015 | Hur | B60N 2/2356 297/367 R |
| 2015/0035339 A1* | 2/2015 | Endou | B60N 2/236 297/367 R |
| 2016/0023577 A1* | 1/2016 | Yamada | B60N 2/2227 297/367 R |

\* cited by examiner

RECLINING DEVICE AND METHOD OF MANUFACTURING RECLINING DEVICE

BACKGROUND OF THE INVENTION

Field of the Invention

The present invention relates to a reclining device having a first member (a ratchet or a seat back side member) having a closed-bottomed cylindrical shape and having internal teeth formed on an inner circumferential surface of the first member along a circumferential direction, a pawl having external teeth capable of meshing with the internal teeth, a second member (a base plate or a seat cushion side member) provided on an opening side of the first member coaxially with and turnably in relation to the first member and having a pawl guide for guiding movement of the pawl between a lock position to prevent the relative turning between the first member and the second member through engagement of the external teeth with the internal teeth, and an unlock position to allow the relative turning through disengagement of the external teeth from the internal teeth, and a cam provided between the first member and the second member coaxially with and turnably in relation to the first member and the second member and urging the pawl to a direction of engaging the external teeth with the internal teeth according to an angle of turn.

Description of the Related Art

For example, JP-2012-200483-A discloses a reclining device which includes a ratchet having a closed-bottomed cylindrical shape and having internal teeth formed on an inner circumferential surface thereof along a circumferential direction, a pawl having external teeth capable of meshing with the internal teeth, a base plate provided on an opening side of the ratchet coaxially with and turnably in relation to the ratchet and having a pawl guide for guiding movement of the pawl between a lock position to prevent the relative turning between the ratchet and the base plate through engagement of the external teeth with the internal teeth, and an unlock position to allow the relative turning through disengagement of the external teeth from the internal teeth, and a cam provided between the ratchet and the base plate coaxially with and turnably in relation to the ratchet and the base plate and urging the pawl to a direction of engaging the external teeth with the internal teeth according to an angle of turn.

In the conventional reclining device, when a strong impact force is applied from the seat back side, the impact force is transmitted, as a force attempting to turn the ratchet (which is a seat back side member), from the internal teeth of the ratchet to the external teeth of the pawl (which is a seat cushion side member). Since the internal teeth of the ratchet and the external teeth of the pawl are formed such that a tooth flank for meshing and mutual contact is tapered in such a manner as to narrow the tooth toward the tooth crest, the tooth flanks of the internal teeth of the ratchet impose force on the corresponding tooth flanks of the external teeth of the pawl in such a direction as to move the pawl upward.

As a result, the external teeth of the pawl are lifted and disengaged from the internal teeth of the ratchet, whereby the pawl attempts to move toward the cam (radially inward). That is, since the contact area between the internal teeth of the ratchet and the external teeth of the pawl reduces, lock strength deteriorates.

SUMMARY OF THE INVENTION

An object of the present invention is to provide a reclining device which can maintain meshing between the internal teeth of a ratchet (which is a seat back side member) and the external teeth of a pawl (which is a seat cushion side member) through restraint of movement of the pawl toward a cam even upon imposition of a strong impact force from the seat back side, thereby maintaining lock strength between the seat back and the seat cushion.

The present invention is configured as mentioned below in [1] to [6]. Reference numerals appearing in the present section are provided for convenience of understanding and should not be construed as limiting the invention.

[1] Configuration 1

A reclining device comprises a first member 21 having a closed-bottomed cylindrical shape and having internal teeth 23 formed on an inner circumferential surface of the first member 21 along a circumferential direction; a pawl 41 having external teeth 41a capable of meshing with the internal teeth 23; a second member 25 provided on an opening side of the first member 21 coaxially with and turnably in relation to the first member 21 and having a pawl guide for guiding movement of the pawl 41 between a lock position to prevent the relative turning between the first member 21 and the second member 25 through engagement of the external teeth 41a with the internal teeth 23, and an unlock position to allow the relative turning through disengagement of the external teeth 41a from the internal teeth 23; and a cam 31 provided between the first member 21 and the second member 25 coaxially with and turnably in relation to the first member 21 and the second member 25 and urging the pawl 41 to a direction of engaging the external teeth 41a with the internal teeth 23 according to an angle of turn. The pawl 41 has opposite side walls 41p and 41q which face and are guided by guide wall surfaces 37a and 37b of the pawl guide and at least one of which is surface roughened.

Surface roughening is a process of intentionally roughening a certain surface in order to increase sliding resistance or friction resistance in sliding on a surface of a counter member. An example of a surface roughening process is blast processing. Other examples include a method of surface roughening by chemical treatment and a method of surface roughening by press working.

[2] Configuration 2

In the reclining device according to configuration 1, the external teeth 41a of the pawl 41 are surface-roughened.

[3] Configuration 3

In the reclining device according to configuration 1 or 2, the pawl 41 further has a surface-roughened inner side wall 41b, 41c which receives urging force from the cam 31.

[4] Configuration 4

A method of manufacturing a reclining device which includes a first member 21 having a closed-bottomed cylindrical shape and having internal teeth 23 formed on an inner circumferential surface of the first member 21 along a circumferential direction, a pawl 41 having external teeth 41a capable of meshing with the internal teeth 23, a second member 25 provided on an opening side of the first member 21 coaxially with and turnably in relation to the first member 21 and having a pawl guide for guiding movement of the pawl 41 between a lock position to prevent the relative turning between the first member 21 and the second member 25 through engagement of the external teeth 41a with the internal teeth 23, and an unlock position to allow the relative turning through disengagement of the external teeth 41a from the internal teeth 23, and a cam 31 provided between the first member 21 and the second member 25 coaxially with and turnably in relation to the first and second members 21 and 25 and urging the pawl 41 to a direction of engaging the external teeth 41a with the internal teeth 23 according to an angle of turn, the method comprising a step of roughening surfaces of side walls 41p and 41q of the pawl 41, the side walls 41p and 41q facing and guided by guide wall surfaces 37a and 37b of the pawl guide.

[5] Configuration 5

The method of manufacturing a reclining device according to configuration 4 further comprises a step of roughening surfaces of the external teeth 41a of the pawl 41.

[6] Configuration 6

The method of manufacturing a reclining device according to configuration 4 or 5 further comprises a step of roughening a surface of an inner side wall 41b, 41c of the pawl 41 at which the pawl 41 is urged by the cam 31.

According to configuration 1, the reclining device comprises the first member 21 having a closed-bottomed cylindrical shape and having the internal teeth 23 formed on the inner circumferential surface along the circumferential direction, the pawl 41 having the external teeth 41a capable of meshing with the internal teeth 23, the second member 25 provided on the opening side of the first member 21 coaxially with and turnably in relation to the first member 21 and having the pawl guide for guiding movement of the pawl 41 between the lock position to prevent the relative turning between the first member 21 and the second member 25 through engagement of the external teeth 41a with the internal teeth 23, and the unlock position to allow the relative turning through disengagement of the external teeth 41a from the internal teeth 23, and the cam 31 provided between the first member 21 and the second member 25 coaxially with and turnably in relation to the first and second members 21 and 25 and urging the pawl 41 to the direction of engaging the external teeth 41a with the internal teeth 23 according to an angle of turn. The pawl 41 has the opposite surface-roughened side walls 41p and 41q facing and guided by the guide wall surfaces 37a and 37b of the pawl guide. Thus, even upon imposition of a strong impact force from the seat back 3 side, movement of the pawl 41 toward the cam 31 can be restrained, whereby meshing can be maintained between the internal teeth 23 of the first member 21 (a seat back 3 side member) and the external teeth 41a of the pawl 41 (a seat cushion 2 side member); thus, lock strength can be maintained between the seat back 3 and the seat cushion 2.

According to configuration 2, in the reclining device according to configuration 1, the external teeth 41a of the pawl 41 are surface-roughened. Thus, the effect of configuration 1 can be enhanced.

According to configuration 3, in the reclining device according to configuration 1 or 2, the pawl 41 further has the surface-roughened inner walls 41b and 41c which receive urging force from the cam 31. Thus, the effect of configuration 1 or 2 can be enhanced.

The method of manufacturing a reclining device according to configurations 4 to 6 can manufacture the reclining device according to configurations 1 to 3.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which:

FIGS. 15A to 15C are schematic top views, wherein FIG. 15A shows the roughened surface of a surface-roughened side wall 41p, 41q; FIG. 15B shows the roughened tooth surface of surface-roughened external teeth 41a; and FIG. 15C shows the roughened surface of a surface-roughened inner side wall 41b, 41c.

DESCRIPTION OF THE PREFERRED EMBODIMENT

An embodiment of the present invention will be described with reference to the drawings.

Figure 7:
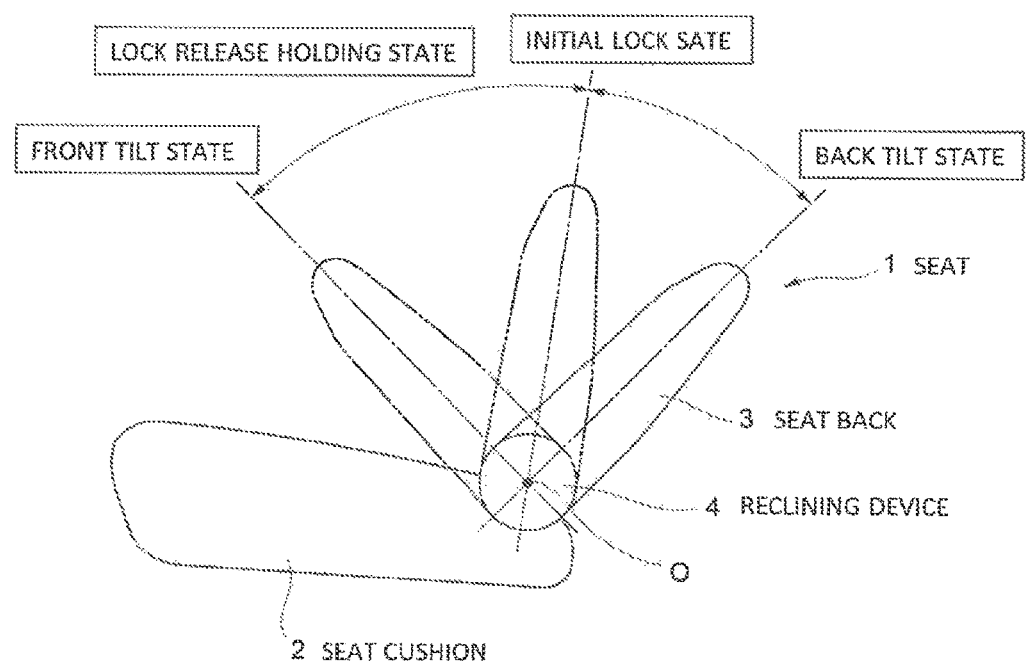
FIG. 7 is a configurational view of a seat having the reclining device of the embodiment.

First, a seat 1 having a reclining device 4 of the present embodiment will be described with reference to FIG. 7. The seat 1 has a seat cushion 2 which supports the buttocks of a seating person, and a seat back 3 which can be tilted back and forth in relation to the seat cushion 2 and supports the back of the seating person. The reclining device 4 is provided coaxially with a pivot axis (O) of tilting of the seat back 3; allows tilting of the seat back 3 in an unlock state or in a lock release holding state; and prevents tilting of the seat back 3 in a lock state.

Specifically, the reclining device 4 allows the seat back 3 to tilt between a front tilt state and a back tilt state. The reclining device 4 allows tilting of the seat back 3 (unlock state) or prevents tilting of the seat back 3 (lock state) in response to a lever operation in the front tilt state or in a range from an initial lock state to the back tilt state; however, in a range from the initial lock state to the front tilt state, a lock release holding mechanism (to be described later in detail) establishes the lock release holding state. In the lock release holding state, the seat back 3 can be tilted at all times without need to operate an operation lever.

The reclining device 4 is provided at the right and left of the seat 1. However, since the two reclining devices 4 have the same structure, the following description discusses one of the two reclining devices 4 with reference to FIGS. 1 to 6, and description of the other one is omitted.

Figure 1:
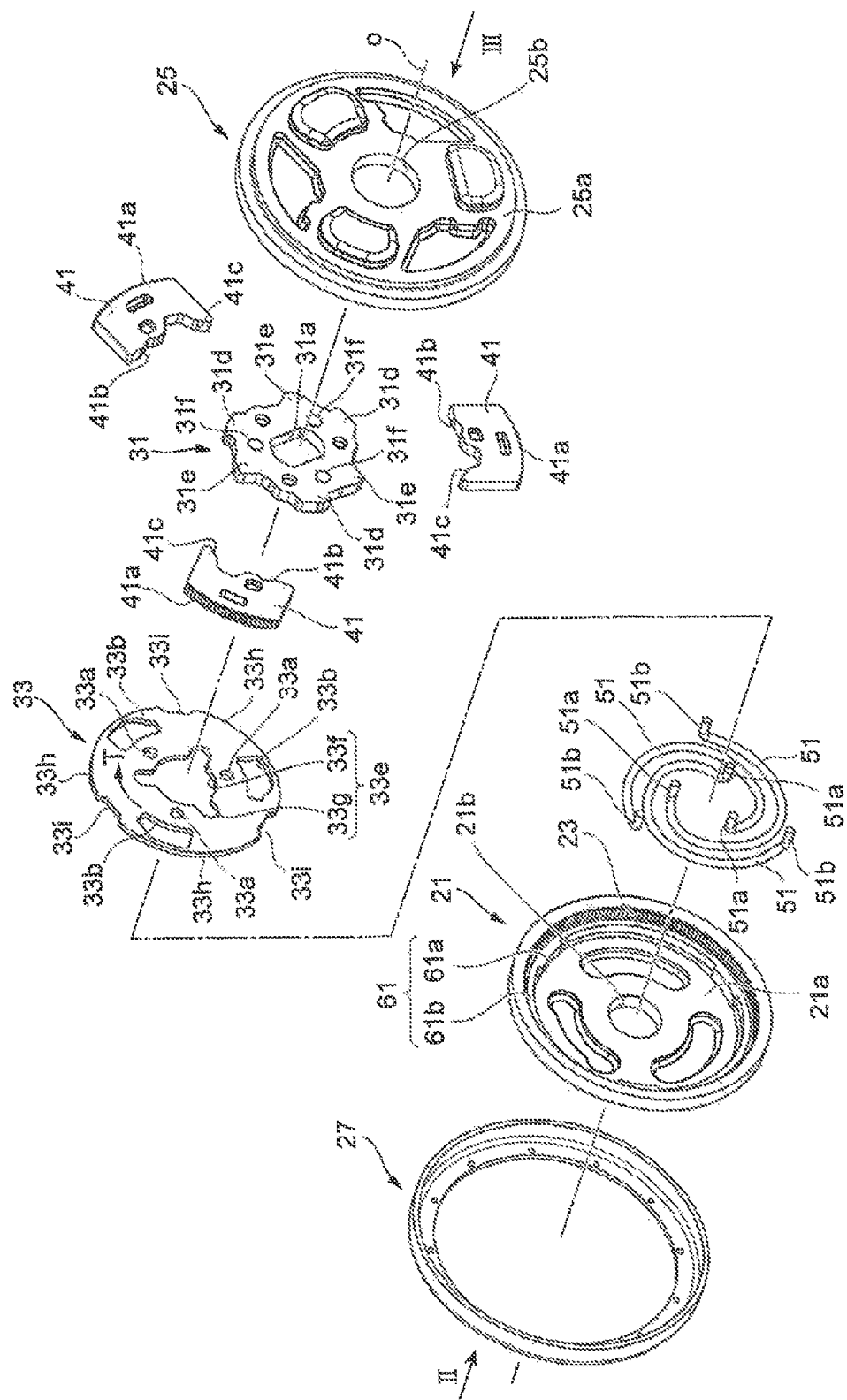
FIG. 1 is an exploded perspective view of a reclining device according to an embodiment of the present invention.
Figure 2:
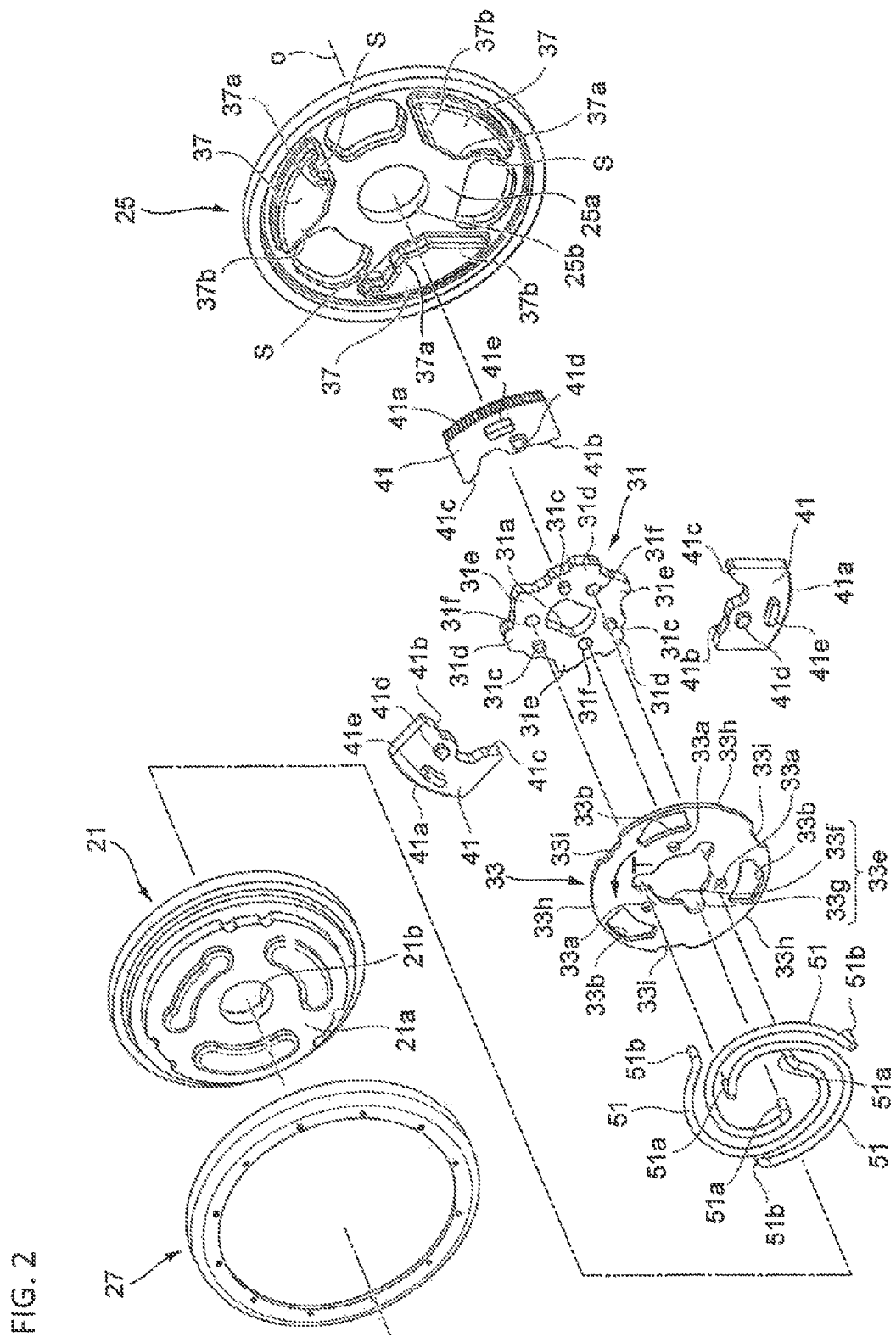
FIG. 2 is an exploded perspective view of the reclining device as viewed from the direction of arrow II of FIG. 1.
Figure 3:
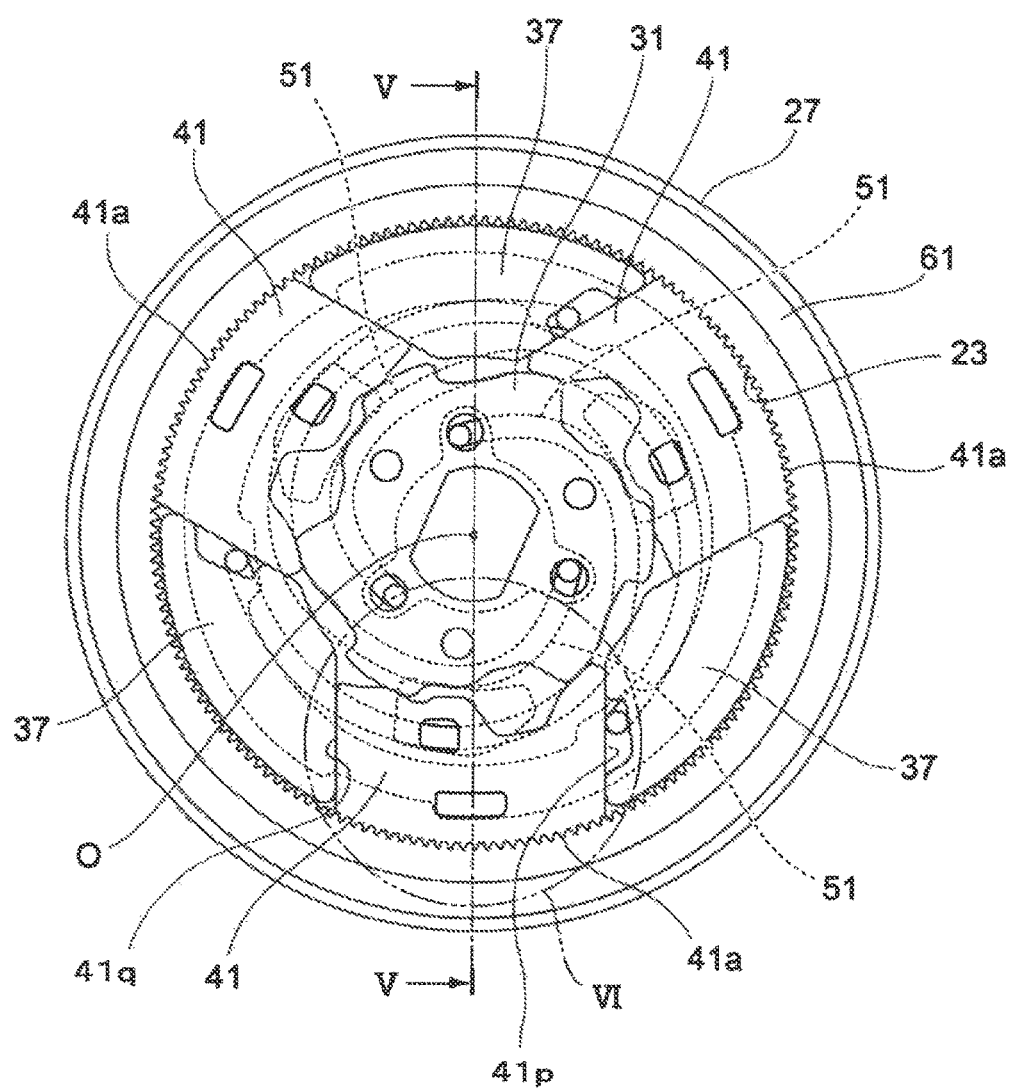
FIG. 3 is a front view (a view from the direction of arrow III of FIG. 1) of the reclining device in an assembled condition, showing a lock state of the reclining device, with a base plate (second member) 25 shown in a see-through condition such that only pawl guides 37 are illustrated.
Figure 4:
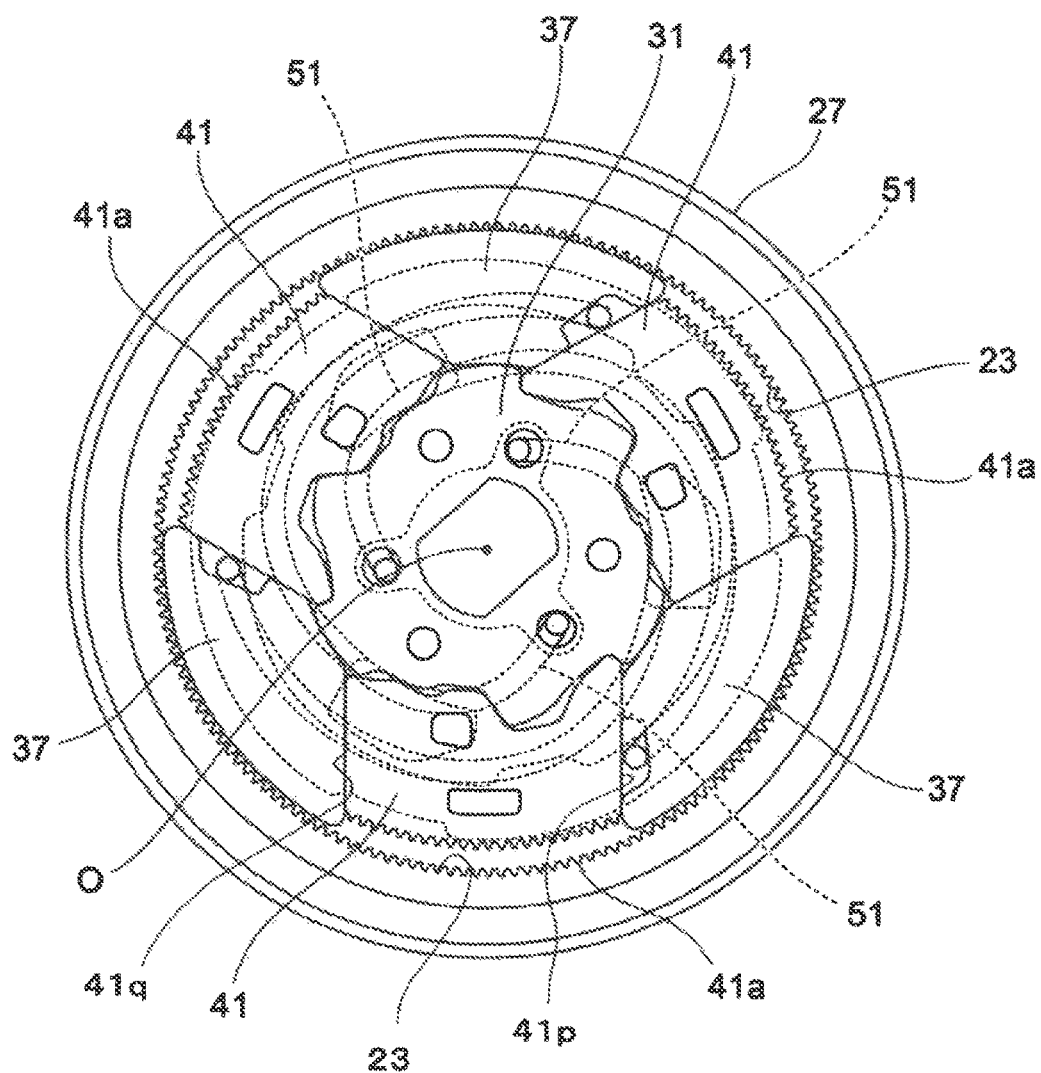
FIG. 4 is a front view (a view from the direction of arrow III of FIG. 1) of the reclining device in the assembled condition, showing an unlock state of the reclining device, with the base plate (second member) 25 shown in the see-through condition such that only the pawl guides 37 are illustrated.
Figure 5:
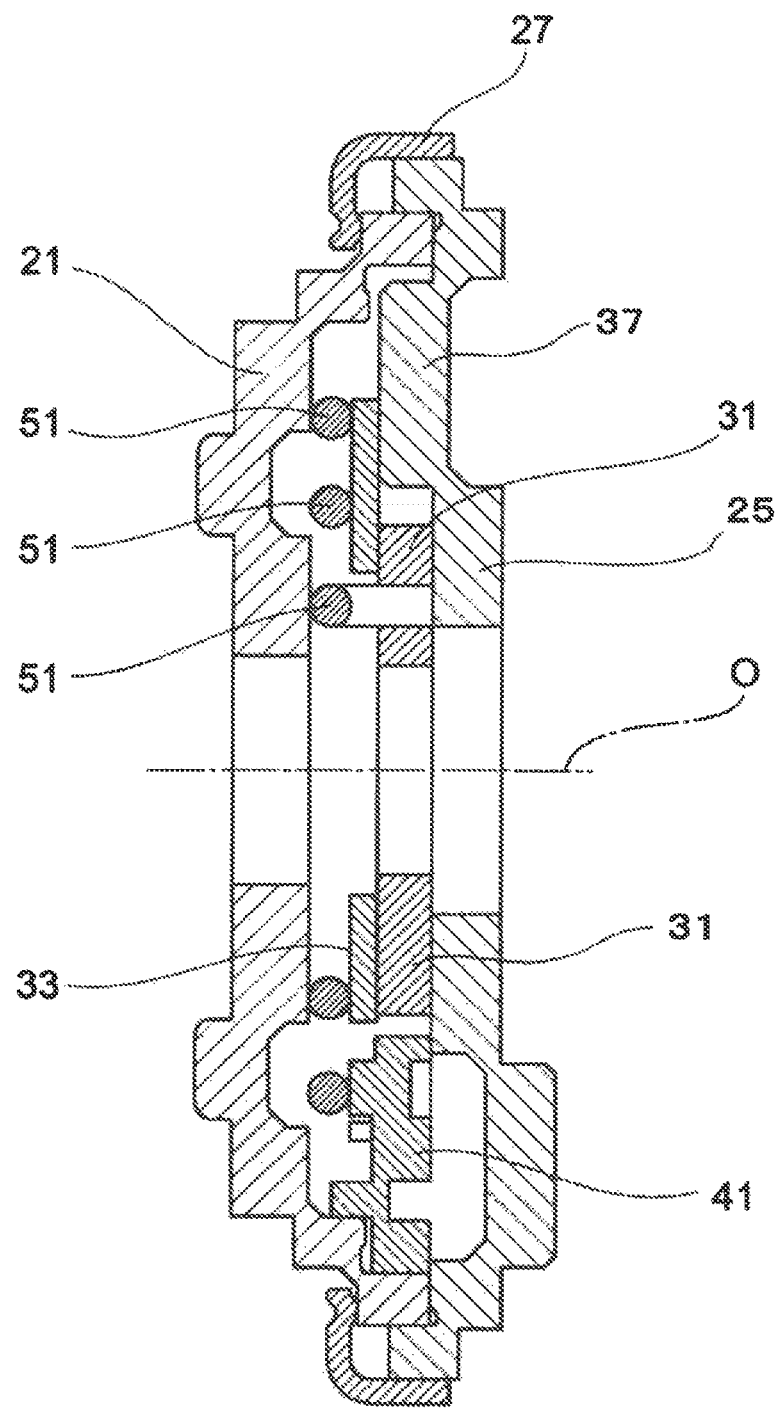
FIG. 5 is a sectional view taken along line V-V of FIG. 3, wherein the entire base plate (second member) is illustrated.
Figure 6:
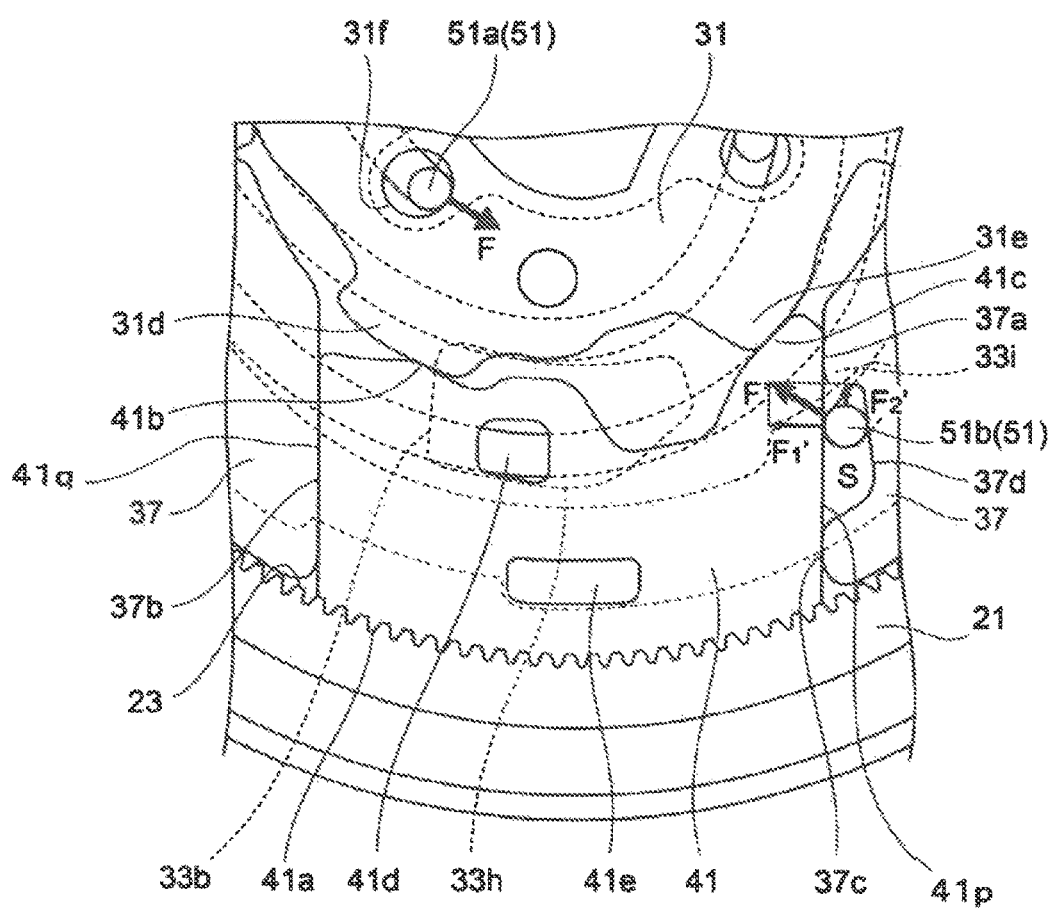
FIG. 6 is an enlarged partial view of a region VI of FIG. 3.

FIG. 1 is an exploded perspective view of the reclining device 4, and FIG. 2 is an exploded perspective view of the reclining device 4 as viewed from the direction of arrow II of FIG. 1. FIG. 3 is a front view (a view from the direction of arrow III of FIG. 1) of the reclining device 4 in an assembled condition, showing the lock state of the reclining device 4. FIG. 4 is a front view of the reclining device 4 in the assembled condition, showing the unlock state of the reclining device 4. In FIGS. 3 and 4, a base plate (second member) 25 is seen through such that only pawl guides 37 thereof are illustrated. FIG. 5 is a sectional view taken along line V-V of FIG. 3. In FIG. 5, the entire base plate (second member) 25 is illustrated. FIG. 6 is an enlarged partial view showing a region VI of FIG. 3.

The overall structure of the reclining device 4 will be described with reference to the drawings such as FIGS. 1 and 2.

A ratchet (first member) 21 provided on a seat back 3 side is formed by half-blanking a disklike plate material into a closed-bottomed cylindrical shape through use of a press, whereby a circular recess portion 21a is formed. Internal teeth 23 are formed on the inner circumferential surface of the cylinder along the entire circumference. The circular recess portion 21a has a through hole 21b formed at the center. A shaft (not shown) disposed along a pivot axis (the axis O in FIGS. 1 and 2) of tilting of the seat back 3 is loosely fitted into the through hole 21b. The shaft (not shown) used in the reclining device 4 has an oval section.

Similar to the ratchet 21, a base plate (second member) 25 provided on a seat cushion 2 side is formed by half-blanking a disklike plate material through use of a press, whereby a circular recess portion 25a is formed. The diameter of the circular recess portion 25a (inside diameter of the cylinder) is slightly greater than the outside diameter of the ratchet 21. The ratchet 21 is loosely fitted into the circular recess portion 25a of the base plate 25, and the ratchet 21 and the base plate 25 are assembled together by an external ring 27. The base plate 25 and the ratchet 21 are turnable in relation to each other. Similar to the ratchet 21, the base plate 25 also has a through hole 25b formed at the center. The shaft (not shown) disposed along the pivot axis (the axis O in FIGS. 1 and 2) of tilting of the seat back 3 is loosely fitted into the through hole 25b.

An outer circumferential portion of the ratchet 21 and an outer circumferential portion of the base plate 25 are held by the external ring 27, whereby the ratchet 21 and the base plate 25 are held in a relatively turnable condition without separation in the direction of the axis O of relative turning. A cam 31 is disposed in a space defined by the circular recess portion 21a of the ratchet 21 and the circular recess portion 25a of the base plate 25. The cam 31 has an oval hole 31a formed at the center. The shaft (not shown) having an oval section is fitted into the oval hole 31a, whereby the shaft and the cam 31 turn unitarily. That is, the cam 31 is turned unitarily by the shaft (not shown) inserted through the oval hole 31a. The shaft functions as a transmission member for transmitting movement of the cam 31 of one of the two reclining devices 4 provided on the opposite sides of the seat 1 to the cam 31 of the other reclining device 4.

The cam 31 has three protrusions 31c protruding toward the ratchet 21. The cam 31 also has three first protrusions 31d and three second protrusions 31e formed alternately on an outer circumferential portion. Further, the cam 31 has three engagement holes 31f to be engaged with respective end portions 51a of three wire springs 51, which will be described later.

A release plate (release cam) 33 is disposed between the cam 31 and the circular recess portion 21a of the ratchet 21. The release plate 33 has engagement holes 33a to be engaged with the respective three protrusions 31c of the cam 31. As a result of the protrusions 31c of the cam 31 being engaged with the engagement holes 33a, the cam 31 and the release plate 33 are unified and turn unitarily.

The release plate 33 has a shaft hole 33e formed at a central portion. The shaft hole 33e is composed of a circular hole 33f through which the unillustrated shaft is loosely inserted, and three radial holes 33g extending in radial directions from the circumference of the circular hole 33f. The radial directions are those of an imaginary circle centered on the axis O, and the same also applies in the following description. The radial holes 33g are disposed circumferentially about the axis O at approximately 120° pitches. The width and the radial length of the radial holes 33g are greater than the diameter of the springs 51. That is, the end portions 51a of the springs 51 can be loosely inserted through the radial holes 33g, respectively.

The cam 31 is located between the release plate 33 and the circular recess portion 25a of the base plate 25. In the same imaginary plane as the cam 31, three pawls 41 are disposed radially outward of the cam 31 at approximately 120° pitches along the circumferential direction of an imaginary circle centered on the axis O.

Figure 15A:
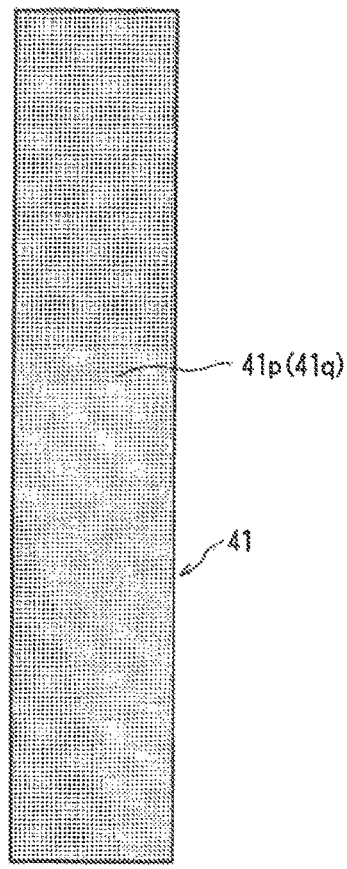
Figure 15B:
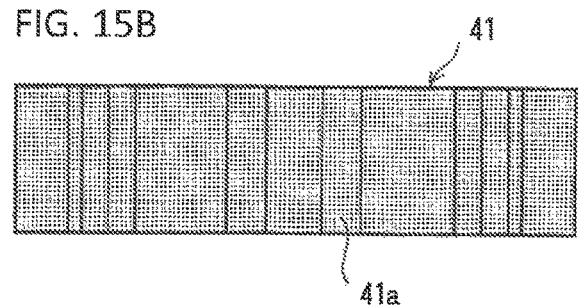

Each of the pawls 41 has external teeth 41a formed on a radially outer surface (a surface which faces the internal teeth 23 of the ratchet 21), and the external teeth 41a are surface-roughened by blast processing to be surface-roughened external teeth 41a (see FIG. 15B). When a strong impact force is applied to the seat back 3, the impact force attempting to turn the ratchet 21 is transmitted to the surface-roughened external teeth 41a through the internal teeth 23 of the ratchet 21 and pushes the tooth flanks of the surface-roughened external teeth 41a in such a manner as to attempt to move the pawls 41 radially inward. In the reclining device 4 of the present embodiment, by virtue of high friction resistance between the internal teeth 23 and the surface-roughened external teeth 41a, turning of the ratchet 21 is prevented, and the pawls 41 try to stay at the current positions. As a result, the surface-roughened external teeth 41a and the internal teeth 23 remain in a contact relation, thereby maintaining lock strength.

Figure 15C:
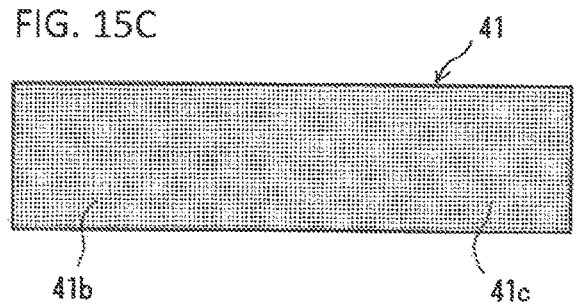

Each of the pawls 41 also has a first inner wall 41b and a second inner wall 41c formed on a surface (a radially inner surface) opposite the surface-roughened external teeth 41a, and the first inner wall 41b and the second inner wall 41c allow contact therewith of the first protrusion 31d of the cam 31 and the second protrusion 31e of the cam 31, respectively. According to the present embodiment, in the lock state, the first protrusions 31d of the cam 31 are in contact with the first inner walls 41b of the pawls 41; however, the second protrusions 31e of the cam 31 are separated from the second inner walls 41c of the pawls 41. The second protrusions 31e of the cam 31 come into contact with the second inner walls 41c of the pawls 41 when the pawls 41 are tilted. Similar to the external teeth 41a, the first inner wall 41b and the second inner wall 41c are also surface-roughened by blast processing to be the first surface-roughened inner wall 41b and the second surface-roughened inner wall 41c (see FIG. 15C). When a strong impact force is applied to the seat back 3, the impact force attempting to turn the ratchet 21 is transmitted to the surface-roughened external teeth 41a through the internal teeth 23 of the ratchet 21 and pushes the tooth flanks of the surface-roughened external teeth 41a in such a manner as to attempt to move the pawls 41 radially inward, which pushing may cause slippage to contact between the first protrusions 31d of the cam 31 and the first surface-roughened inner walls 41b of the pawls 41 and to contact between the second protrusions 31e of the cam 31 and the second surface-roughened inner walls 41c of the pawls 41. In the reclining device 4 of the present embodiment, such slippage is prevented by friction resistance between the first protrusions 31d and the first surface-roughened inner walls 41b and by friction resistance between the second protrusions 31e and the second surface-roughened inner walls 41c. Thus, the cam 31 tries to keep the pawls 41 at the current positions; as a result, the surface-roughened external teeth 41a and the internal teeth 23 remain in a contact relation, thereby maintaining lock strength.

The circular recess portion 25a of the base plate 25 has three pawl guide protrusions 37 formed at 120° pitches along the circumferential direction of an imaginary circle centered on the axis O of relative turning. The pawl 41 located between the two adjacent pawl guide protrusions 37; in other words, the pawl 41 disposed between guide wall surfaces 37a and 37b of the two adjacent pawl guide protrusions 37, can move radially while being guided by the guide wall surfaces 37a and 37b. That is, each pawl 41 can move between a lock position where the surface-roughened external teeth 41a mesh with the internal teeth 23 of the ratchet 21, and an unlock position where the surface-roughened external teeth 41a are unmeshed from the internal teeth 23 of the ratchet 21.

Opposite side walls 41p and 41q (see FIGS. 3 and 4) of the pawl 41 are in sliding contact with and guided by the guide wall surfaces 37a and 37b of the pawl guides 37 during radial movement of the pawl 41 and are roughened by blast processing to be surface-roughened side walls 41p and 41q, thereby being increased in sliding resistance (see FIG. 15A). When a strong impact force is applied to the seat back 3, the impact force attempting to turn the ratchet 21 is transmitted to the surface-roughened external teeth 41a through the internal teeth 23 of the ratchet 21 and pushes the tooth flanks of the surface-roughened external teeth 41a in such a manner as to attempt to move the pawls 41 radially inward. In the reclining device 4 of the present embodiment, by virtue of the sliding resistance preventing movement of the pawls 41, the pawls 41 try to stay at the current positions. As a result, the surface-roughened external teeth 41a and the internal teeth 23 remain in a contact relation, thereby maintaining lock strength.

Each of the pawls 41 has a protrusion 41d protruding toward the release plate 33 and formed on a surface facing the release plate 33. The release plate 33 has three cam holes 33b to be engaged with the protrusions 41d of the pawls 41, respectively. The cam holes 33b have inclined surfaces in contact with the protrusions 41d of the pawls 41, respectively. When the release plate 33 is turned in the direction opposite the direction of arrow T in FIGS. 1 and 2, the protrusions 41d are pressed by the respective inclined surfaces. As a result, the pawls 41 move radially inward while being in sliding contact with and guided by the guide wall surfaces 37a and 37b of the pawl guides 37. That is, the surface-roughened external teeth 41a move in the unlocking direction of separating from the internal teeth 23 of the ratchet 21. In other words, the inclined surfaces of the cam holes 33b of the release plate 33 are formed into such a shape as to cause such a movement.

Three approximately C-shaped wire springs 51 are disposed between the release plate 33 and the circular recess portion 21a of the ratchet 21. Now, the lock release holding mechanism for holding the pawls 41 at the unlock position in the reclining device 4 of the present embodiment will be described.

As shown in FIG. 1, the ratchet (first member) 21 has an arc-shaped guide 61 formed on its inner cylindrical surface on a bottom surface side of the internal teeth 23, protruding toward the axis O of relative turning, and extending along the circumferential direction. The guide 61 is composed of two types of arc-shaped protrusions which differ in the amount of protrusion toward the axis O of relative turning (the amount of radially inward protrusion). A first arc-shaped protrusion 61a is composed of three small-diameter portions (relatively small in a radial distance between the axis O and the protruding end of the arc-shaped protrusion 61a) each having a central angle corresponding to an angle range within which the reclining device 4 is in the lock release holding state. The second arc-shaped protrusion 61b is composed of three large-diameter portions provided between the three small-diameter portions and smaller in the amount of radially inward protrusion than the small-diameter portions.

As shown in FIG. 2, each of the pawls 41 has a protrusion 41e capable of coming into contact with the protruding end of the arc-shaped guide 61 (the first arc-shaped protrusion 61a and the second arc-shaped protrusion 61b) of the ratchet 21.

The amount of protrusion of the second arc-shaped protrusions 61b is determined such that in a state in which the protrusions 41e of the pawls 41 face the respective second arc-shaped protrusions 61b, the surface-roughened external teeth 41a of the pawls 41 can mesh with the internal teeth 23 of the ratchet 21. The amount of protrusion of the first arc-shaped protrusions 61a is determined such that in a state in which the protrusions 41e of the pawls 41 face the respective first arc-shaped protrusions 61a, the surface-roughened external teeth 41a of the pawls 41 cannot mesh with the internal teeth 23 of the ratchet 21.

Through employment of such amounts of protrusion, when the protrusions 41e of the pawls 41 move onto the protruding ends of the respective first arc-shaped protrusions 61a of the ratchet 21 in the course of turning, the pawls 41 move radially inward. As a result, the surface-roughened external teeth 41a separate from the internal teeth 23, thereby establishing an unlock state. The unlock state is maintained while the protrusions 41e of the pawls 41 are on the protruding ends of the respective first arc-shaped protrusions 61a of the ratchet 21. That is, the lock release holding mechanism is activated.

Next, a mechanism of preventing play between the pawls 41 and the pawl guides 37 by means of the springs 51, etc., will be described with reference to FIG. 1, FIGS. 3 and 4, and FIG. 6.

The two adjacent pawl guides 37 with the pawl 41 disposed therebetween respectively have the first guide wall surface 37a which faces one side wall (the surface-roughened inner wall 41p) of the pawl 41, and the second guide wall surface 37b which faces the other side wall (the surface-roughened inner wall 41q) of the pawl 41. Here, attention is paid to a certain pawl 41, and the pawl guides 37 located on opposite sides of the pawl 41 are described. However, when attention is paid to a certain pawl guide 37, the right side wall surface of the pawl guide 37 serves as the second guide wall surface 37b, and the left side wall surface of the pawl guide 37 serves as the first guide wall surface 37a when viewed from the same direction of view as that of FIG. 1, FIGS. 3 and 4, and FIG. 6. A space S mentioned below is partially defined by a cut 37d formed in a side wall 37c of the pawl guide 37 which encompasses the first guide wall surface 37a.

The space S has the form of a wedge such that the distance between the surface of the surface-roughened side wall 41p of the pawl 41 and the wall surface of the cut 37d formed in the side wall 37c of the pawl guide 37 gradually reduces radially inward.

One end portion of each of the three approximately C-shaped wire springs 51 is bent toward the base plate 25 to form an end portion 51a, and the other end portion is bent toward the base plate 25 to form an end portion 51b. In a state in which each wire spring 51 is elastically deformed in such a manner that the C-shape is expanded outward, the one end portion 51a is inserted through the radial hole 33g of the shaft hole 33e of the release plate 33 and engaged with the engagement hole 31f formed in the cam 31. Also, the other end portion 51b is inserted into the wedgelike space S. As a result, as shown in FIG. 6, each spring 51 urges the inner wall surface of the engagement hole 31f and the walls which define the space S, with an inwardly restoring force. Specifically, each spring 51 urges the cam 31 with force F and urges the surface-roughened side wall 41p of the pawl 41 and the inside of the cut 37d of the pawl guide 37 with respective components of force F'.

As a result, play between the pawls 41 and the pawl guides 37 is prevented.

As a result of the cam 31 being urged with force F as mentioned above, the cam 31 urges the pawls 41 such that the first protrusions 31d of the cam 31 come into contact with and urge the first surface-roughened inner walls 41b of the pawls 41 and such that the second protrusions 31e of the cam 31 come into contact with and urge the second surface-roughened inner walls 41c of the pawls 41. As a result, the pawls 41 move radially outward, whereby the surface-roughened external teeth 41a mesh with the internal teeth 23 to establish a lock state, and the lock state is maintained.

The end portion 51b inserted into the wedgelike space S directly presses the surface-roughened side wall 41p of the pawl 41 with force F'. Component F1' of force F' presses the pawl 41 in such a direction as to remove play between the pawl 41 and the pawl guide 37. Component F2' of force F' urges the end portion 51b of the wire spring 51 in such a direction as to bite into the wedgelike space S; i.e., in a direction toward the unlock position of the pawl 41. Thus, the play is prevented, and the end portion 51b is firmly fitted in the narrowing direction of the space S.

In the reclining device 4 of the present embodiment, the release plate 33 has three protrusions 33h and three recesses 33i formed alternately on its rim. These three protrusions 33h and three recesses 33i are designed such that in a lock state in which the surface-roughened external teeth 41a of the pawls 41 mesh with the internal teeth 23a of the ratchet 21, the end portions 51b of the wire springs 51 and the recesses 33i of the release plate 33 face one another.

Thus, as a result of turning in the unlocking direction, the end portions 51b move onto the respective protrusions 33h to move radially outward. In other words, the end portions 51b are moved toward the ends of the spaces S toward which the spaces S expand. As a result, force to press the pawls 41 is weakened, thereby smoothing movement (movement in the unlocking direction) of the pawls 41.

The operation of the thus-configured reclining device 4 will next be described.

Usually, because of elastic resilient force of the wire springs 51, the pawls 41 provided in the base plate 25 are urged through the cam 31 to be located at the lock position where the surface-roughened external teeth 41a mesh with the internal teeth 23 of the ratchet 21, thereby preventing relative turning between the ratchet (first member) 21 and the base plate (second member) 25. That is, the seat back 3 is in a state (lock state) in which the seat back 3 cannot turn in relation to the seat cushion 2.

When the cam 31 is operated against urging force of the wire springs 51 to be turned in the other direction (the direction opposite arrow T), since the protrusions 31c of the cam 31 and the engagement holes 33a of the release plate 33 are engaged respectively, the release plate 33 also turns with the cam 31. First, the relative potions of the end portions 51b of the wire springs 51 along the rim of the release plate 33 change from the positions of the recesses 33i to the positions of the protrusions 33h. The end portions 51b of the wire springs 51 urged in such a direction as to bite into the respective wedgelike spaces S are caused, by the protrusions 33h of the release plate 33, to move in the direction opposite the direction of biting into the wedgelike spaces S, thereby weakening force with which the wire springs 51 press the surface-roughened side walls 41p of the pawls 41.

Further, as the release plate 33 turns, the inclined surfaces of those cam holes 33b of the release plate 33 which the protrusions 41d of the pawls 41 are in contact with cause the pawls 41 to move to the unlock position where the surface-roughened external teeth 41a and the internal teeth 23 of the ratchet 21 are unmeshed from each other, thereby allowing relative turning between the ratchet (first member) 21 and the base plate (second member) 25. That is, the seat back 3 can turn in relation to the seat cushion 2.

When operating force applied to the cam 31 is removed, urging force of the wire springs 51 causes the cam 31 and the release plate 33 to return to their original positions; as a result, the relative potions of the end portions 51b of the wire springs 51 along the rim of the release plate 33 change from the positions of the protrusions 33h to the positions of the recesses 33i, and the surface-roughened external teeth 41a of the pawls 41 mesh with the internal teeth 23 of the ratchet 21, thereby preventing relative turning between the ratchet (first member) 21 and the base plate (second member) 25. That is, the lock state is established again.

The reclining device 4 of the present embodiment yields the following effects.

(1) The wedgelike spaces S are provided between the surface-roughened side walls 41p of the pawls 41 and the guide wall surfaces 37a and are configured to gradually narrow in the direction along which the pawls 41 are guided, and the end portions 51b of the wire springs 51 are inserted into the wedgelike spaces S. Thus, the end portions 51b press the respective pawls 41 with force F'. Force F' acts in such a manner as to remove play between the pawls 41 and the pawl guides 37. Therefore, play of the seat back can be prevented, and conventionally required other members for pressing the pawls against the pawl guides are unnecessary.

(2) Before causing the pawls 41 to move toward the unlock position, the release plate 33 causes the end portions 51b of the wire springs 51 to move in the direction opposite the direction of biting into the wedgelike spaces S. As a result, force with which the wire springs 51 press the surface-roughened side walls 41p of the pawls 41 is weakened, so that the pawls 41 can smoothly move toward the unlock position.

(3) Each pawl guide 37 has the cut 37d formed in the guide wall surface 37a such that the width of the cut 37d along the circumferential direction of a circle centered on the axis O of relative turning gradually narrows toward the axis O. Therefore, there is no need for the pawls 41 to have a cut, thereby preventing deterioration in strength of the pawls 41.

The present invention is not limited to the above embodiment.

For example, the wedgelike space S may have configurations as shown in FIGS. 8 to 14.

In FIGS. 8 to 14, members similar to those shown in FIGS. 1 to 7 are denoted by like reference numerals, and repeated description thereof is omitted.

Figure 8:
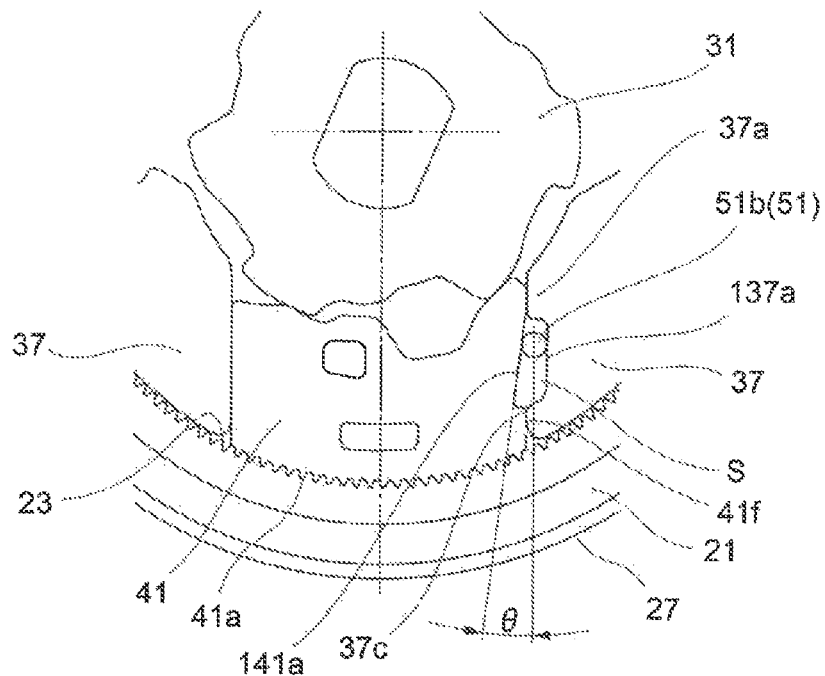
FIG. 8 is an explanatory view exemplifying another configuration of the wedgelike space.
Figure 9:
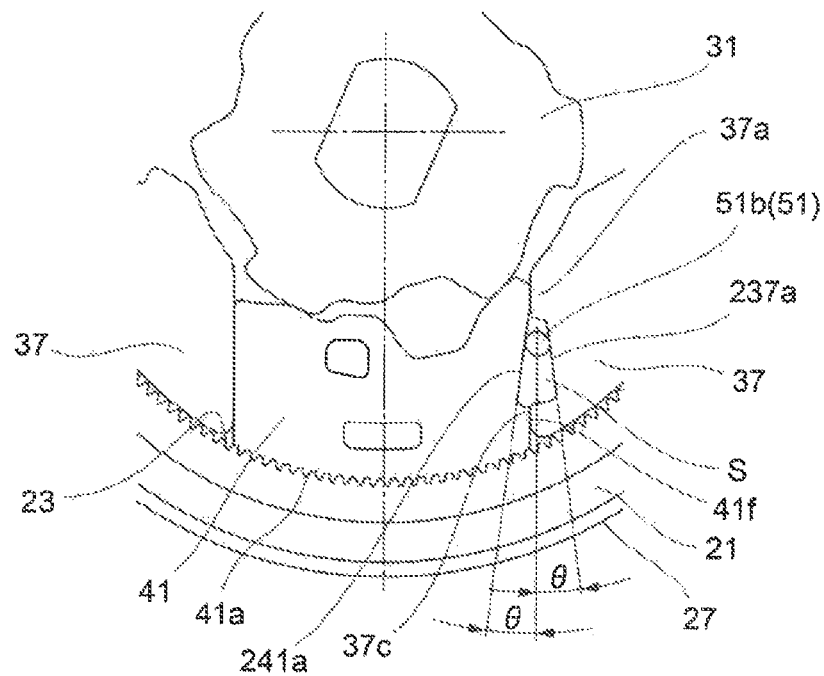
FIG. 9 is an explanatory view exemplifying a further configuration of the wedgelike space.
Figure 10:
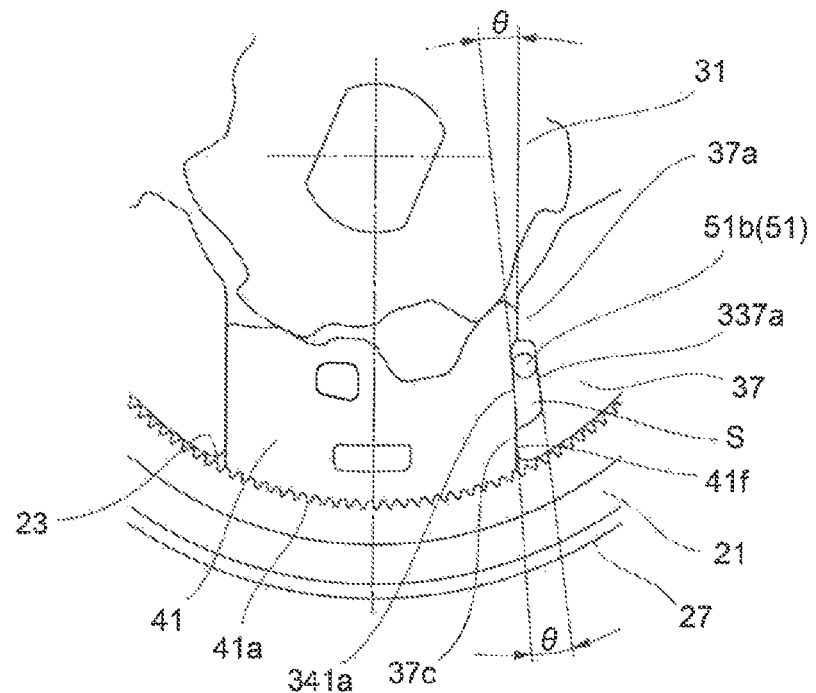
FIG. 10 is an explanatory view exemplifying a still further configuration of the wedgelike space.

First, FIGS. 8 to 10 show other configurations of the wedgelike space S in which the width of the space S along the circumferential direction of a circle centered on the axis O of relative turning gradually decreases toward the axis O as in the case of the above embodiment.

In FIG. 8, the pawl 41 has a cut 141*a* formed therein and having a bottom surface inclined from the pawl guide side wall 37*c* and from the surface-roughened side wall 41*p*, and the guide wall surface 37*a* has a cut 137*a* formed therein and having a bottom surface in parallel with the pawl guide side wall 37*c* and with the surface-roughened side wall 41*p*.

In FIG. 9, the pawl 41 and the guide wall surface 37*a* have a cut 241*a* and a cut 237*a* formed therein respectively and having respective bottom surfaces inclined from the pawl guide side wall 37*c* and from the surface-roughened side wall 41*p*.

The bottom surfaces of the cuts 241*a* and 237*a* are inclined such that the depths of the cuts 241*a* and 237*a* shallow toward the axis O of relative turning.

In FIG. 10, the pawl 41 and the guide wall surface 37*a* have a cut 341*a* and a cut 337*a* formed therein respectively and having respective bottom surfaces inclined from the pawl guide side wall 37*c* and from the surface-roughened side wall 41*p*. The bottom surface of the cut 337*a* is inclined such that the depth of the cut 337*a* shallows toward the axis O of relative turning. The bottom surface of the cut 341*a* is inclined such that the depth of the cut 341*a* is deepened toward the axis O of relative turning.

Next, FIGS. 11 to 14 show configurations of a wedgelike space S' in which, different from the above embodiment, the width of the space S' along the circumferential direction of a circle centered on the axis O of relative turning gradually increases toward the axis O.

Figure 11:
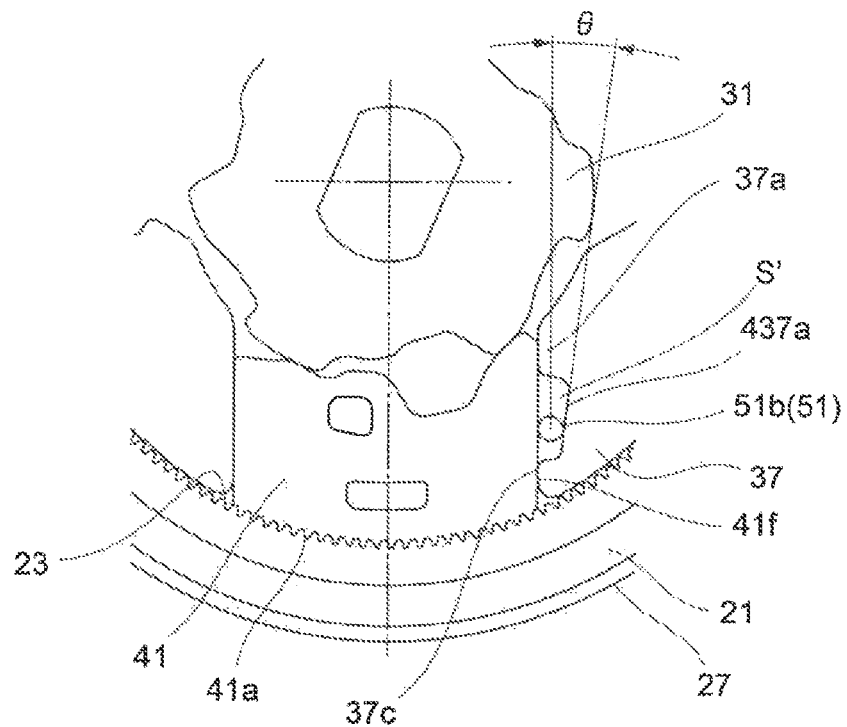
FIG. 11 is an explanatory view exemplifying a yet another configuration of the wedgelike space.

In FIG. 11, only the guide wall surface 37*a* has a cut 437*a* formed therein and having a bottom surface inclined from the pawl guide side wall 37*c* and from the surface-roughened side wall 41*p*.

Figure 12:
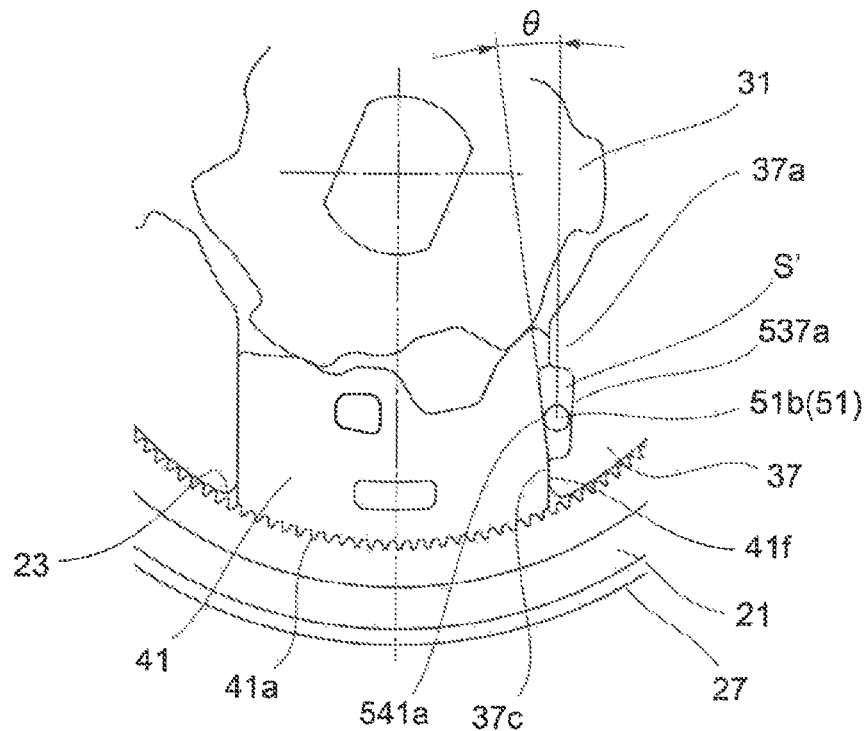
FIG. 12 is an explanatory view exemplifying another configuration of the wedgelike space.

In FIG. 12, the pawl 41 has a cut 541*a* formed therein and having a bottom surface inclined from the pawl guide side wall 37*c* and from the surface-roughened side wall 41*p*, and the guide wall surface 37*a* has a cut 537*a* formed therein and having a bottom surface in parallel with the pawl guide side wall 37*c* and with the surface-roughened side wall 41*p*.

Figure 13:
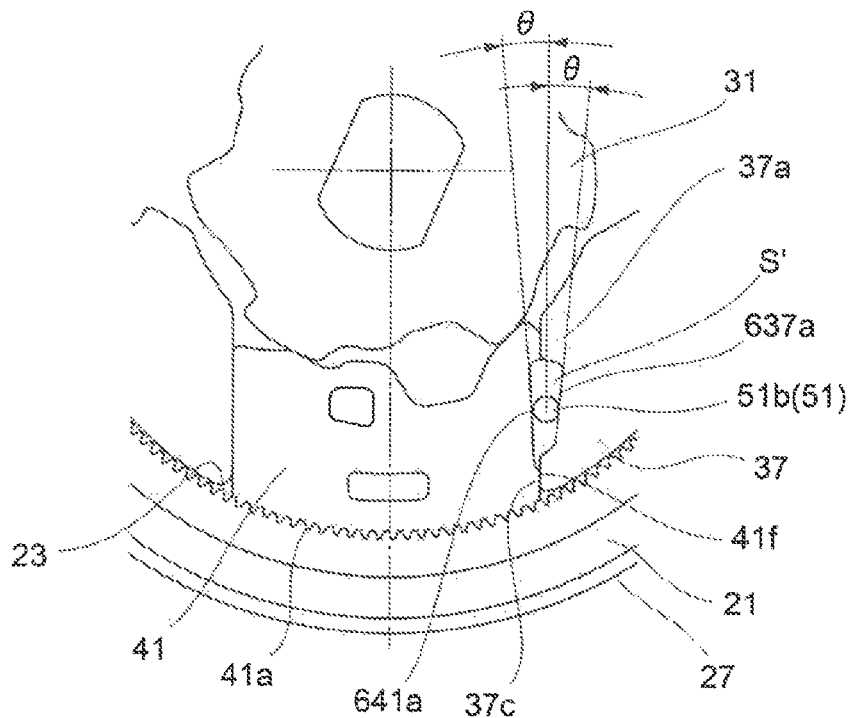
FIG. 13 is an explanatory view exemplifying a further configuration of the wedgelike space.

In FIG. 13, the pawl 41 and the guide wall surface 37*a* have a cut 641*a* and a cut 637*a* formed therein respectively and having respective bottom surfaces inclined from the pawl guide side wall 37*c* and from the surface-roughened side wall 41*p*.

The bottom surfaces of the cuts 641*a* and 637*a* are inclined such that the depths of the cuts 641*a* and 637*a* deepen toward the axis O of relative turning. An end portion of the cut 641*a* located away from the axis O of relative turning and the surface-roughened inner wall 41*c* of the pawl 41 circumferentially lap over.

Figure 14:
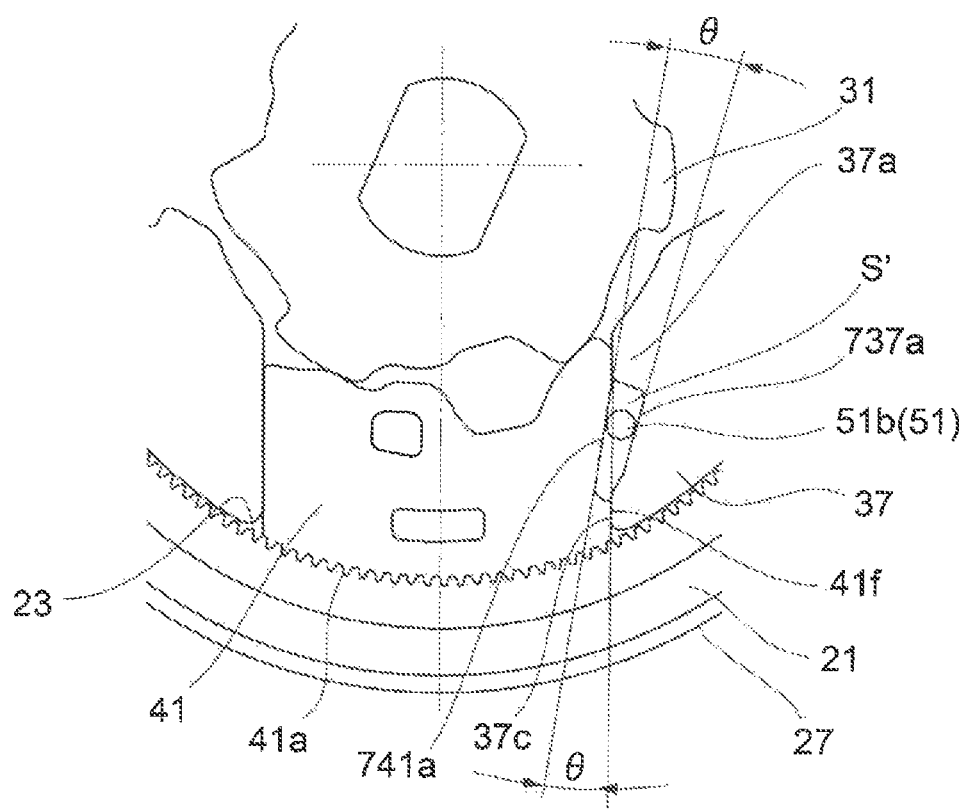
FIG. 14 is an explanatory view exemplifying a still further configuration of the wedgelike space.

In FIG. 14, the pawl 41 and the guide wall surface 37*a* have a cut 741*a* and a cut 737*a* formed therein respectively and having respective bottom surfaces inclined from the pawl guide side wall 37*c* and from the surface-roughened side wall 41*p*.

The bottom surface of the cut 737*a* is inclined such that the depth of the cut 737*a* deepens toward the axis O of relative turning. The bottom surface of the cut 741*a* is inclined such that the depth of the cut 741*a* shallows toward the axis O of relative turning.

Further, in the above embodiment, the end portions 51*a* of the wire springs 51 are engaged with the cam 31 and urge the cam 31. However, the end portions 51*a* may be engaged with the release plate 33 which turns unitarily with the cam 31.

Next, surface roughening will be described.

In the above embodiment, the pawls 41 undergo blast processing to surface-roughen the external teeth 41*a*, the side walls 41*p* and 41*q*, and the inner side walls 41*b* and 41*c* for increasing friction resistance and sliding resistance. The process of surface roughening is not limited to blast processing; for example, an object surface may be roughened by use of chemicals. Alternatively, an object surface may be roughened by use of a press. Also, other surfaces of the pawl 41 may be surface-roughened. Only either one of the side walls 41*p* and 41*q* may be surface-roughened. Also, only either one of the inner side walls 41*b* and 41*c* may be surface-roughened.

In the case where a press is used for roughening, the press may be a separate press (a press for roughening an object surface different from a press for forming the pawl 41) or may be a press which forms the pawl 41 and roughens an object surface simultaneously. For such processing, for example, irregularities for surface-roughening are formed on the surface of a die.

The blast process mentioned in the above embodiment may be a known blast process capable of roughening an object surface to a desired degree. For example, when the external teeth 41*a* are surface-roughened, particle size must be sufficiently small, as compared with the tooth size, so as not to damage the function of the external teeth 41*a* as gear teeth.

What is claimed is:
1. A reclining device, comprising:
    a first member having a closed-bottomed cylindrical shape and including internal teeth fanned on an inner circumferential surface of the first member along a circumferential direction;
    a pawl including external teeth capable of meshing with the internal teeth;
    a second member provided on an opening side of the first member coaxially with and turnably in relation to the first member and including a pawl guide for guiding movement of the pawl between a lock position to prevent a relative turning between the first member and the second member through engagement of the external teeth with the internal teeth, and an unlock position to allow the relative turning through disengagement of the external teeth from the internal teeth; and
    a cam provided between the first member and the second member coaxially with and turnably in relation to the first and second members and urging the pawl to a direction of engaging the external teeth with the internal teeth,
    wherein the pawl includes opposite side walls which face, and are guided by, guide wall surfaces of the pawl guide, and at least one of the opposite side walls of the pawl includes a rough surface for increasing a friction resistance.

2. A reclining device according to claim 1, wherein the external teeth of the pawl include a rough surface for increasing a friction resistance.

3. A reclining device according to claim 1, wherein an inner side wall of the pawl, which receives an urging force from the cam, includes a rough surface for increasing a friction resistance.

4. A reclining device according to claim 2, wherein an inner side wall of the pawl, which receives an urging force from the cam, includes a rough surface for increasing a friction resistance.

* * * * *